United States Patent
Wang et al.

(10) Patent No.: US 12,267,394 B2
(45) Date of Patent: Apr. 1, 2025

(54) DEVICE MANAGEMENT METHOD AND APPARATUS

(71) Applicant: HUAWEI TECHNOLOGIES CO., LTD., Guangdong (CN)

(72) Inventors: Jianping Wang, Hangzhou (CN); Guangying Zheng, Nanjing (CN); Qin Wu, Nanjing (CN); Zhiguo Zhu, Nanjing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 393 days.

(21) Appl. No.: 17/842,148

(22) Filed: Jun. 16, 2022

(65) Prior Publication Data

US 2022/0311831 A1 Sep. 29, 2022

Related U.S. Application Data

(63) Continuation of application No. PCT/CN2020/116633, filed on Sep. 22, 2020.

(30) Foreign Application Priority Data

Dec. 17, 2019 (CN) .......................... 201911303844.2

(51) Int. Cl.
*H04L 67/146* (2022.01)
*H04L 41/04* (2022.01)
*H04L 67/55* (2022.01)

(52) U.S. Cl.
CPC ............ *H04L 67/146* (2013.01); *H04L 41/04* (2013.01); *H04L 67/55* (2022.05)

(58) Field of Classification Search
CPC ........ H04L 67/146; H04L 67/55; H04L 41/04

(Continued)

(56) References Cited

U.S. PATENT DOCUMENTS

2008/0052556 A1* 2/2008 Donovan ................. H04L 69/40
714/E11.073
2011/0167172 A1* 7/2011 Roach .................. H04L 65/1104
709/239

(Continued)

FOREIGN PATENT DOCUMENTS

CN 1852122 A 10/2006
CN 101035026 A 9/2007

(Continued)

OTHER PUBLICATIONS

Enns R et al: "NETCONF Configuration Protocol; draft-ietf-netconf-4741 bis-00.txt",NETCONF Configuration Protocol;Draft-IETF-NETCONF-4741 BIS-00.TXT, Internet Engineeringtask Force, IETF; Standardworkingdraft, Internetsociety (ISOC) 4, Rue Des Falaises CH 1205 Geneva,. Switzerland, vol. netconf, Mar. 4, 2009 (Mar. 4, 2009), XP015061120.

*Primary Examiner* — James E Springer
(74) *Attorney, Agent, or Firm* — WOMBLE BOND DICKINSON (US) LLP

(57) ABSTRACT

An embodiment of this application discloses a device management method. A first network management device may obtain subscription parameter information, where the subscription parameter information is used to indicate a subscription parameter used during a process of establishing a first subscription session, and the first subscription session is used to indicate a first network device to send subscription data to a network management device managing the first network device. After the first network management device determines that the first subscription session is interrupted, the first network management device may generate a request message based on the subscription parameter information, and send the request message to a network device managed by the first network management device.

20 Claims, 8 Drawing Sheets

(58) Field of Classification Search
USPC .......................................................... 709/223
See application file for complete search history.

(56) References Cited

U.S. PATENT DOCUMENTS

| | | |
|---|---|---|
| 2012/0198268 A1 | 8/2012 | Qureshi |
| 2015/0067178 A1* | 3/2015 | Tregenza Dancer ........................ H04L 65/104 709/227 |
| 2016/0211979 A1 | 7/2016 | Alarcon et al. |
| 2018/0097968 A1 | 4/2018 | Sato |
| 2018/0241615 A1* | 8/2018 | Livanos .............. H04L 41/0668 |
| 2022/0255818 A1* | 8/2022 | Zhang ................. H04L 63/0435 |
| 2022/0337479 A1* | 10/2022 | Zheng .................. H04L 41/145 |

FOREIGN PATENT DOCUMENTS

| | | |
|---|---|---|
| CN | 102209313 A | 10/2011 |
| CN | 108809538 A | 11/2018 |
| CN | 109525625 A | 3/2019 |
| CN | 109729505 A | 5/2019 |
| CN | 110011840 A | 7/2019 |

\* cited by examiner

```
augment    /ncc:netconf-client/ncc:initiate/ncc:netconf-server
   +--rw  server-clusters
      +--rw  server-cluster
         +--rw  cluster-role (active/standby) indentityref
         +--rw  primary-server (key) leafref
         +--rw  Secondly-server   leafref
         +--rw  third-server      leafref
```

```
augment  /ncc:netconf-client/ncc:listen/ncc:endpoint
    +--rw  server-clusters
       +--rw  server-cluster
          +--rw  server-cluster-role (active/standby) indentityref
          +--rw  primary-server (key) leafref
          +--rw  Secondly-server leafref
          +--rw  third-server      leafref
```

FIG. 2b

```
augment /ncc:netconf-server/ncc:call-home/ncc:netconf-cilent
    +--rw  client-clusters
       +--rw  client-cluster
          +--rw  client-cluster-role (active/standby) indentityref
          +--rw  primary-client (key) identityref
          +--rw  secondly-client leafref
          +--rw  third-client leafref
```

FIG. 2c

```
augment  /ncc:netconf-server/ncc:listen/ncc:endpoint
    +--rw  client-clusters
       +--rw  client-cluster
          +--rw  client-cluster-role (active/standby) indentityref
          +--rw  primary-client (key) identityref
          +--rw  Secondly-client  leafref
          +--rw  third-client      leafref
```

FIG. 2d

```
augment /message/notifications
   +--ro type identityref
   +--ro server-clusters
      +--ro server-cluster
            +--ro cluster-role identityref
                     +--ro primary-server leafref
                     +--ro Secondly-server leafref
                     +--ro third-server leafref
   +--ro sessions
         +--ro username string
         +--ro client-address string
                     +--ro server-address string
                     +--ro port string
                     +--ro session-id string
   +--ro subscription
         +--ro static-subscription-id string
         +--ro datastore identityref
         +--ro selection-filter
            +---w datastore-subtree-filter
            +---w datastore-xpath-filter
         +--w yp:periodic
            +---w yp:periodic
            +---w yp:anchor-time
```

FIG. 4a

```
augment /xxx/keepalive
  +---keepalive
      +--ro type identityref
      +--ro server-clusters
          +--ro server-cluster
              +--ro cluster-role identityref
                  +--ro primary-server leafref
                  +--ro Secondly-server leafref
                  +--ro third-server leafref
  +--ro sessions
      +--ro username string
      +--ro client-address string
                  +--ro server-address string
                  +--ro port string
                  +--ro session-id string
  +--ro subscription
      +--ro static-subscription-id string
      +--ro datastore identityref
      +--ro selection-filter
      +---w datastore-subtree-filter
      +---w datastore-xpath-filter
      +--w yp:periodic
          +---w yp:periodic
          +---w yp:anchor-time
```

FIG. 4b

```
augment /yp:establish-subscription/yp:input
        +-- flag identityref
    +-- timeout uint16
         +---client-clusters
    +--ro client-cluster
      +--ro client-cluster-role identityref
      +--ro primary-client    identityref
      +--ro Secondly-client leafref
      +--ro third-client leafref
    +---ro static-subscription-id string
```

DEVICE MANAGEMENT METHOD AND APPARATUS

CROSS-REFERENCE TO RELATED APPLICATIONS

This application is a continuation of International Application No. PCT/CN2020/116633, filed on Sep. 22, 2020, which claims priority to Chinese Patent Application No. 201911303844.2, filed on Dec. 17, 2019. The disclosures of the aforementioned applications are hereby incorporated by reference in their entireties.

TECHNICAL FIELD

This application relates to the field of device management, and in particular, to a device management method and an apparatus.

BACKGROUND

A network management device may establish a subscription session with a network device, and collect and analyze data of the network device. For example, the network management device may send, to the network device, a subscription request for establishing the subscription session, and the network device reports subscription data to the network management device based on the received subscription request.

In actual application, the subscription session may be interrupted. For example, the subscription session is interrupted due to a cause such as a fault on the network management device or a fault on the network device. Once the subscription session is interrupted, the network device cannot continue to report the subscription data to the network management device. In this case, if there is a need to enable the network device to be capable of continuing to report the subscription data to the network management device, a subscription session indicating the network device to report the subscription data needs to be re-established by using manual configuration by network management personnel. However, efficiency in re-establishing the subscription session by using the manual configuration by the network management personnel is relatively low.

In view of this, there is an urgent need for a solution to the foregoing problem.

SUMMARY

Embodiments of this application provide a device management method, to efficiently re-establish a subscription session after the subscription session is interrupted, thereby resolving a problem of relatively low efficiency in re-establishing a subscription session in a conventional technology.

According to a first aspect, an embodiment of this application provides a device management method. For example, a first network management device can obtain subscription parameter information. The subscription parameter information is used to indicate a subscription parameter used during a process of establishing a first subscription session, and the first subscription session is used to indicate a first network device to send subscription data to a network management device managing the first network device. After the first network management device determines that the first subscription session is interrupted, because the first network management device already obtains the subscription parameter information, the first network management device can generate a request message based on the subscription parameter information. For example, the request message may include the subscription parameter, and the subscription parameter is used to establish a second subscription session. The second subscription session is used to indicate a network device managed by the first network management device to send subscription data to the first network management device. The network device managed by the first network management device may be the first network device, or may be a second network device. Then, the first network management device sends the request message to the network device managed by the first network management device, to establish the second subscription session between the first network management device and the network device managed by the first network management device. It can be understood that because the second subscription session is established based on the subscription parameter information of the first subscription session, a data type and a data reporting manner that the second subscription session indicates to report are generally the same as those that the first subscription session indicates to report. In other words, the second subscription session can be considered as a re-established first subscription session. It can be learned that, according to the solution of this embodiment of this application, the first network management device can establish the second subscription session with the first network device or the second network device based on the subscription parameter information, without a need to manually configure the subscription parameter by network management personnel, thereby improving efficiency in re-establishing a subscription session.

In an embodiment, the network management device managing the first network device may be the second network management device. For example, if an active/standby switchover occurs on the network management device after the first subscription session is interrupted, the foregoing network management device managing the first network device is the second network management device. If the first network management device and the second network management device belong to a same network management device cluster, the first network management device is a standby device of the second network management device. If the second network management device and the first network management device belong to different network management device clusters, for example, the first network management device belongs to a first network management device cluster and the second network management device belongs to a second network management device cluster, the first network management device cluster is a standby cluster of the second network management device cluster. In addition, the first network management device is an active device in the first network management device cluster, because when the standby network management device cluster enters a working state, an active device in the standby network management device cluster first enters the working state.

In an embodiment, the network device managed by the first network management device may be the first network device or the second network device. For example, if no switchover occurs on the first network device after the first subscription session is interrupted, the foregoing network device managed by the first network management device is the first network device. If the first network device does not continue to work after the first subscription session is interrupted, the foregoing network device managed by the first network management device is the second network device. If the first network device and the second network device belong to a same network device cluster, the second network device is a standby device of the first network device. If the second network device and the first network device belong to different network device clusters, for example, the first network device belongs to a first network device cluster and the second network device belongs to a second network device cluster, the second network device cluster is a standby cluster of the first network device cluster. In addition, the second network device is an active device in the second network device cluster, because when the standby network device cluster enters a working state, an active device in the standby network cluster first enters the working state.

In an embodiment, the first network management device may pre-store the subscription parameter information. Therefore, the first network management device may obtain the subscription parameter information by reading the pre-stored subscription parameter information.

In an embodiment, the first network management device may store the subscription parameter information in the following manner: Before the first network device determines that the first network device needs to restart due to a fault or before an active/standby switchover needs to be performed, the first network device may send, to the first network management device, a first message carrying the subscription parameter information. The first network management device may store the subscription parameter information based on the first message.

In an embodiment, if the first message is sent to the first network management device before the first network device needs to perform an active/standby switchover, after the first subscription session is interrupted, the network device managed by the first network management device is no longer the first network device, but instead, is the second network device. In this case, the first message may carry an identifier of the second network device, and the identifier of the second network device is used to indicate the first network management device to establish the second subscription session with the second network device after the first subscription session is interrupted. In other words, the first network management device may determine, also by using the first message, to send the foregoing request message to the second network device, to establish the second subscription session with the second network device.

In an embodiment, when the network management device managing the first network device is the second network management device, it indicates that the first subscription session is established by the second management device. In this case, the first network management device may store the subscription parameter information in the following manner: After establishing the first subscription session, the second network management device may send the foregoing subscription parameter information to the first network management device, and after receiving the subscription parameter information from the second network management device, the first network management device may store the subscription parameter information.

In an embodiment, the subscription parameter information may indicate the subscription parameter used during the process of establishing the first subscription session. Therefore, in an embodiment, the subscription parameter information may be the subscription parameter used during the process of establishing the first subscription session.

In an embodiment, considering that in actual application, a subscription identifier of the first subscription session may identify the first subscription session, the subscription parameter used during the process of establishing the first subscription session may also be determined based on the subscription identifier. Therefore, the subscription parameter information may alternatively be the subscription identifier of the first subscription session.

In an embodiment, the subscription parameter information may alternatively be the subscription identifier of the first subscription session. It can be understood that a subscription parameter is used to indicate a subscription data type and a data reporting manner for reporting to a network management device by a network device. Therefore, the network device managed by the first network management device can report subscription data to the first network management device only after determining the subscription parameter. In view of this, if the subscription parameter information is the subscription identifier of the first subscription session, the network device managed by the first network management device stores the subscription identifier and a subscription parameter corresponding to the subscription identifier. The subscription parameter corresponding to the subscription identifier is the subscription parameter used during the process of establishing the first subscription session. In this way, after receiving the request message including the foregoing subscription identifier, the network device managed by the first network management device can determine, based on a mapping relationship stored by the network device itself between the subscription identifier and the subscription parameter, the subscription parameter corresponding to the subscription identifier, to report subscription data to the first network management device based on the subscription parameter.

In an embodiment, the network device managed by the first network management device may store the subscription identifier and the subscription parameter in the following manner: If the network device managed by the first network management device is the first network device, it indicates that no active/standby switchover occurs on the network device after the first subscription session is interrupted. The first subscription session is established by the network management device managing the first network device, and during establishment of the first subscription session, the first network device can obtain the subscription parameter from the network management device managing the first network device. Therefore, after receiving the subscription parameter information, the first network device can store the subscription parameter and the corresponding subscription identifier. In addition, considering that in actual application, there may be many subscription sessions between the first network device and the network management device managing the first network device, if the first network device stores a subscription parameter corresponding to each subscription session, a relatively large amount of storage space of the first network device may be occupied. Therefore, the first network device may store, based on an indication from the network management device managing the first network device, a subscription parameter corresponding to the first subscription session. For example, the first network device may store, based on a second message from the network management device managing the first network device, the subscription identifier and the subscription parameter corresponding to the subscription identifier.

In an embodiment, to reduce a quantity of interactions between the first network device and the network management device managing the first network device, the second message may be carried in a message for establishing the first subscription session. In other words, when establishing the first subscription session, the network management device managing the first network device indicates the first network device to store the subscription identifier and the subscription parameter.

In an embodiment, if the network management device managing the first network device is the second network management device, and after the first subscription session is interrupted, an active/standby switchover occurs on the network management device managing the first network device, the second message may further carry an identifier of the first network management device. The identifier of the first network management device is used to indicate the first network device to establish the second subscription session after receiving the request message from the first network management device. In other words, after receiving the request message from the first network management device, the first network device may further verify whether the request message is from a network management device that has permission to manage the first network device. After determining that the request message is from a standby device of the second network management device, the first network device may determine that the verification succeeds, to establish the second subscription session and send subscription data to the first network management device based on the second subscription session.

In an embodiment, the network device managed by the first network management device may store the subscription identifier and the subscription parameter in the following manner: If the network device managed by the first network management device is the second network device, it indicates that an active/standby switchover occurs on the network device after the first subscription session is interrupted. The first subscription session is established by the network management device managing the first network device, and during establishment of the first subscription session, the first network device can obtain the subscription parameter from the network management device managing the first network device. Therefore, after receiving the subscription parameter information, the first network device can send the subscription parameter and the corresponding subscription identifier to the second network device, and the second network device can store the subscription parameter and the corresponding subscription identifier.

In an embodiment, considering that in actual application, there may be many subscription sessions between the first network device and the network management device managing the first network device, if the first network device sends, to the second network device, a subscription parameter and a subscription identifier that correspond to each subscription session, a relatively large amount of data exchanged between the first network device and the second network device is caused. This occupies a relatively large quantity of I/O resources of the first network device. Therefore, the first network device may send, to the second network device based on an indication from the network management device managing the first network device, the subscription parameter and the subscription identifier corresponding to the first subscription session. For example, the first network device may send, to the second network device based on a third message from the network management device managing the first network device, the subscription identifier and the subscription parameter corresponding to the subscription identifier.

In an embodiment, to reduce a quantity of interactions between the first network device and the network management device managing the first network device, the third message may be carried in a message for establishing the first subscription session. In other words, when establishing the first subscription session, the network management device managing the first network device indicates the first network device to send the subscription identifier and the subscription parameter to the second network device.

According to a second aspect, an embodiment of this application provides a device management apparatus, applied to a first network management device. The apparatus includes an obtaining unit, a generation unit, and a sending unit. The obtaining unit is configured to obtain subscription parameter information, where the subscription parameter information indicates a subscription parameter used during a process of establishing a first subscription session, and the first subscription session is used to indicate a first network device to send subscription data to a network management device managing the first network device. The generation unit is configured to generate a request message after it is determined that the first subscription session is interrupted, where the request message includes the subscription parameter information, and the subscription parameter information in the request message is used to establish a second subscription session. The second subscription session is used to indicate a network device managed by the first network management device to send subscription data to the first network management device. The network device managed by the first network management device includes a second network device or the first network device. The sending unit is configured to send the request message to the network device managed by the first network management device.

In an embodiment, the network management device managing the first network device includes a second network management device. The first network management device and the second network management device belong to a same network management device cluster, and the first network management device is a standby device of the second network management device. Alternatively, the first network management device belongs to a first network management device cluster, the second network management device belongs to a second network management device cluster, the first network management device is an active device in the first network management device cluster, and the first network management device cluster is a standby network management device cluster of the second network management device cluster.

In an embodiment, the first network device and the second network device belong to a same network device cluster, and the second network device is a standby device of the first network device. Alternatively, the first network device belongs to a first network device cluster, the second network device belongs to a second network device cluster, the second network device is an active device in the second network device cluster, and the second network device cluster is a standby network device cluster of the first network device cluster.

In an embodiment, the obtaining unit is configured to obtain the pre-stored subscription parameter information.

In an embodiment, the network management device managing the first network device is the first network management device, and the apparatus further includes: a first receiving unit and a first storage unit. The first receiving unit is configured to receive a first message from the first network device, where the first message carries the subscription parameter information. The first storage unit is configured to store the received subscription parameter information.

In an embodiment, when the network device managed by the first network management device is the second network device, the first message carries an identifier of the second network device, and the identifier of the second network device is used to indicate the first network management device to establish the second subscription session with the second network device.

In an embodiment, the apparatus further includes a second receiving unit and a second storage unit. The second receiving unit is configured to receive the subscription parameter information from the second network device. The second storage unit is configured to store the received subscription parameter information. The obtaining unit is configured to obtain the pre-stored subscription parameter information.

In an embodiment, the subscription parameter information includes a subscription parameter of the first subscription session, and the subscription parameter of the first subscription session is the subscription parameter used during the process of establishing the first subscription session.

In an embodiment, the subscription parameter information includes a subscription identifier of the first subscription session. The network device managed by the first network management device stores the subscription identifier and a subscription parameter corresponding to the subscription identifier, and the subscription parameter is the subscription parameter used during the process of establishing the first subscription session.

In an embodiment, when the network device managed by the first network management device is the first network device, the corresponding subscription identifier and subscription parameter that are stored in the first network device are stored based on a second message from the network management device managing the first network device.

In an embodiment, the second message is carried in a message for establishing the first subscription session.

In an embodiment, when the network management device managing the first network device is the second network management device, the second message further carries an identifier of the first network management device, and the identifier of the first network management device is used to indicate the first network device to establish the second subscription session after receiving the request message from the first network management device.

In an embodiment, when the network device managed by the first network management device is the second network device, the corresponding subscription identifier and subscription parameter that are stored in the second network device are sent by the first network device to the second network device.

In an embodiment, the corresponding subscription identifier and subscription parameter that are stored in the second network device are sent by the first network device to the second network device based on a third message, and the third message is from the network management device managing the first network device.

In an embodiment, the third message is carried in a message for establishing the first subscription session.

According to a third aspect, an embodiment of this application provides a device, including a processor and a memory. The memory is configured to store instructions or a computer program. The processor is configured to execute the instructions or the computer program, to perform the method according to any implementation of the first aspect.

According to a fourth aspect, an embodiment of this application provides a computer-readable storage medium, including instructions or a computer program. When the instructions are run or the computer program is run on a computer, the computer is enabled to perform the method according to any implementation of the first aspect.

According to a fifth aspect, an embodiment of this application provides a computer program product including instructions. When the instructions are run on a computer, the computer is enabled to perform the method according to any implementation of the first aspect.

BRIEF DESCRIPTION OF DRAWINGS

To describe technical solutions in embodiments of this application or in a current technology more clearly, the following briefly describes the accompanying drawings used to describe the embodiments or the current technology. It is clear that, the accompanying drawings in the following descriptions show some embodiments of this application, and a person of ordinary skill in the art may still derive another drawing from these accompanying drawings without creative efforts.

FIG. 2b is a schematic diagram of a YANG data model used to describe a network device cluster according to an embodiment of this application;

FIG. 2c is a schematic diagram of a YANG data model used to describe a network management device cluster according to an embodiment of this application;

FIG. 2d is a schematic diagram of a YANG data model used to describe a network management device cluster according to an embodiment of this application;

FIG. 4a is a schematic diagram of a YANG data model of a notification message according to an embodiment of this application;

FIG. 4b is a schematic diagram of a YANG data model of a keepalive packet according to an embodiment of this application;

DESCRIPTION OF EMBODIMENTS

Embodiments of this application provide a device management method, to efficiently re-establish a subscription session after the subscription session is interrupted, thereby resolving a problem of relatively low efficiency in re-establishing a subscription session in a conventional technology.

Figure 1A:
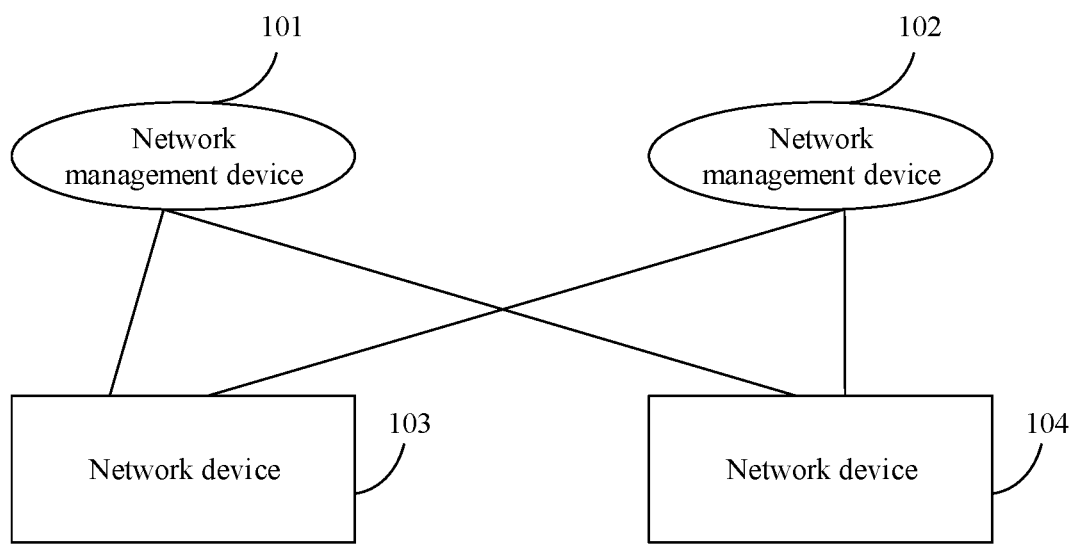
FIG. 1a is a schematic diagram of an example application scenario.

For ease of understanding, a possible application scenario of embodiments of this application is first described. FIG. 1a is a schematic diagram of an example application scenario.

In the scenario shown in FIG. 1a, a network management device 101 may be configured to control and manage a network device 103 and a network device 104. The network device 104 is a standby device of the network device 103. Generally, the network device 103 is in a working state, and the network device 104 is in a standby state. Once the network device 103 becomes faulty, the network device 104 enters the working state. In addition, the network management device 101 may also have a standby device, such as a network management device 102 shown in FIG. 1. Generally, the network management device 101 controls and manages the network device 103 and the network device 104. Once the network management device 101 becomes faulty, the network management device 102 controls and manages the network device 103 and the network device 104.

Figures 1B, 2A:
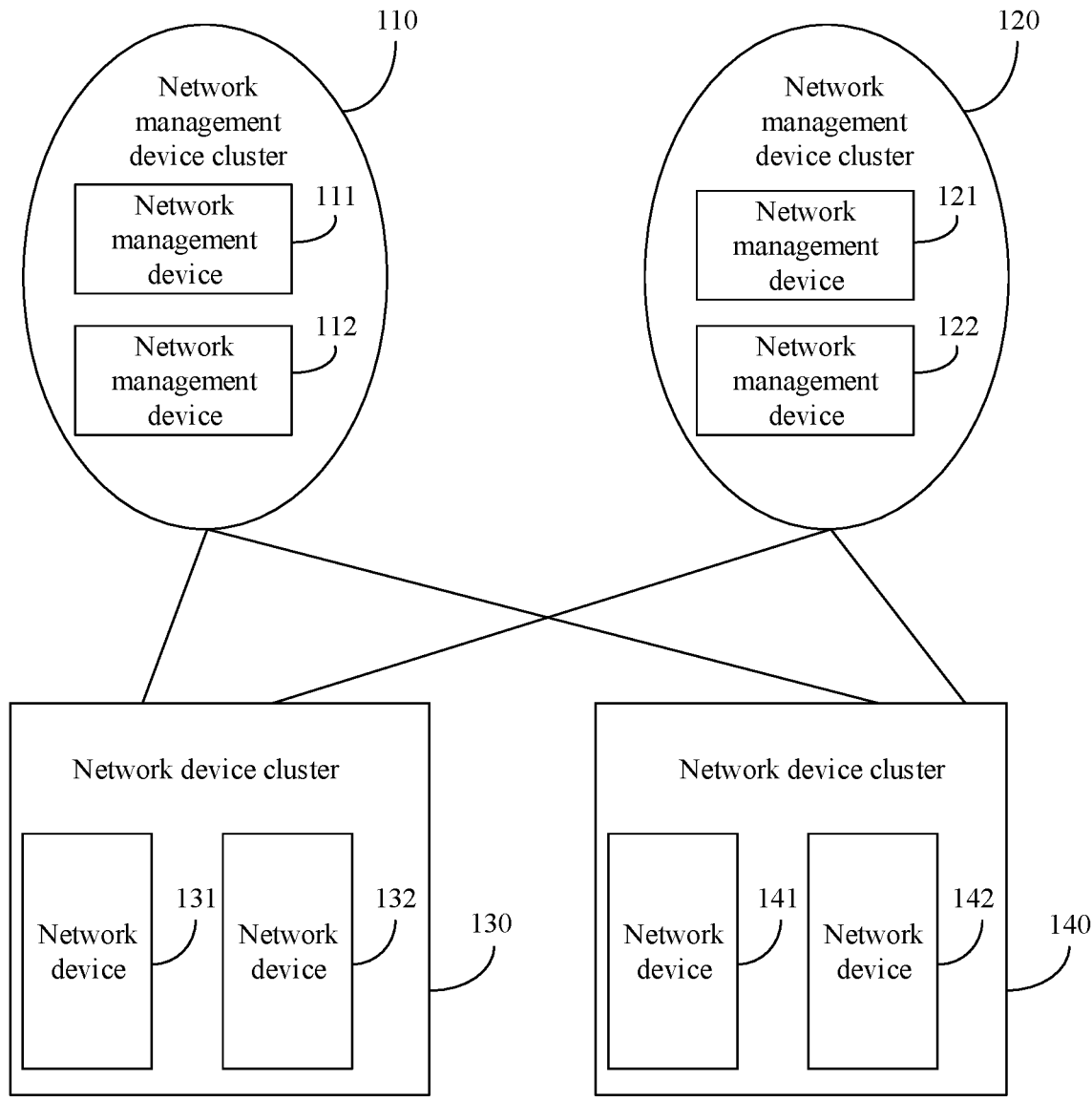
FIG. 1b is a schematic diagram of another example application scenario.
FIG. 2a is a schematic diagram of a YANG data model used to describe a network device cluster according to an embodiment of this application.

FIG. 1b is a schematic diagram of an example application scenario according to an embodiment of this application. In the scenario shown in FIG. 1b, a network management device cluster 110 and a network management device cluster 120 are configured to manage a network device cluster 130 and a network device cluster 140. The network management device cluster 110 is an active network management device cluster, and the network management device cluster 120 is a standby network management device cluster. The network device cluster 130 is an active network device cluster, and the network device cluster 140 is a standby network device cluster.

The network management device cluster 110 may include a plurality of network management devices. In FIG. 1b, an example in which the network management device cluster 110 includes the network management device 111 and the network management device 112 is used for description. The network management device 111 is an active device, and the network management device 112 is a standby device. The network management device cluster 120 may include a plurality of network management devices. In FIG. 1b, an example in which the network management device cluster 120 includes a network management device 121 and a network management device 122 is used for description. The network management device 121 is an active device, and the network management device 122 is a standby device. The network device cluster 130 may include a plurality of network devices. In FIG. 1b, an example in which the network device cluster 130 includes a network device 131 and a network device 132 is used for description. The network device 131 is an active device, and the network device 132 is a standby device. The network device cluster 140 may include a plurality of network devices. In FIG. 1b, an example in which network device cluster 140 includes a network device 141 and a network device 142 is used for description. The network device 141 is an active device, and the network device 142 is a standby device.

After all network management devices in the network management device cluster 110 are faulty, the network management device cluster 120 enters the working state. For example, the active device (which is the network management device 121) in the network management device cluster 120 controls and manages the network device. After all network devices in the network device cluster 130 are faulty, the network device cluster 140 enters the working state, and the active device (which is the network device 141) in the network device cluster 140 enters the working state. In this case, the network management device can control and manage the network device 141.

Regarding the cluster mentioned above, it should be noted that the cluster may include a group of devices that are independent of each other and that are interconnected through a high-speed network, and one cluster may correspond to one management domain.

An example in which the network management device 101 manages the network device 103 is used below to describe an embodiment in which the network management device manages and controls a network management device managed by the network management device.

The network management device 101 and the network device 103 may interact with each other by using the Network Configuration Protocol (NETCONF) or the Representational State Transfer Configuration Protocol (Representational State Transfer Configuration Protocol, RESTCONF). The NETCONF supports a subscription notification mechanism based on a YANG data model. For example, YANG-Push provides a subscription push mechanism, through which the network management device 101 can send a subscription request to the network device 103. The subscription request is used to establish a subscription session between the network management device 101 and the network device 103. After the subscription session is established, the network device 103 can report subscription data to the network management device 101 based on the subscription session.

There are two reporting manners in which the network device 103 reports subscription data to the network management device 101. One of the two reporting manners is periodic reporting: The network device 103 reports data to the network management device 101 based on a preset period. The other reporting manner is: reporting data to the network management device 101 when the subscription data changes. That the subscription data changes is described with an example: The network management device 101 indicates the network device 103 to report data, which is central processing unit (CPU) usage of the network device 103, and the CPU utilization of the network device 103 is stable at 60% in a time period. In this case, in the time period in which the CPU utilization is stable at 60%, the network device 103 does not need to report a specific value of the CPU utilization to the network management device 101. Once the CPU utilization of the network device 103 changes, for example, changes from 60% to 65%, the network device 103 reports the specific value 65% of the CPU utilization to the network management device 101.

In a conventional technology, the subscription session between the network management device 101 and the network device 103 may be interrupted. For example, the network management device 101 performs a restart operation, and during a process of performing the restart operation by the network management device 101, a NETCONF connection between the network management device 101 and the network device 103 is interrupted, causing an interruption of the subscription session between the network management device 101 and the network device 103. For another example, the network device 103 performs a restart operation, and during a process of performing the restart operation by the network device 103, a NETCONF connection between the network management device 101 and the network device 103 is interrupted, causing an interruption of the subscription session between the network management device 101 and the network device 103. For another example, the network management device 101 becomes faulty, and therefore the network management device 102 enters the working state, that is, the network management device 102 controls and manages the network device 103. In this case, the NETCONF connection between the network management device 101 and the network device 103 is also interrupted, causing an interruption of the subscription session between the network management device 101 and the network device 103. For another example, the network device 103 becomes faulty, and therefore the network device 104 enters the working state. In this case, the NETCONF connection between the network management device 101 and the network device 103 is also interrupted, causing an interruption of the subscription session between the network management device 101 and the network device 103.

It can be understood that the subscription session is used to indicate the network device 103 to report subscription data to the network management device 101, and the subscription data reported by the network device 103 to the network management device 101, especially important data such as alarm information, is particularly important for the network management device 101 to analyze a running status of the network device 103. Therefore, after the subscription session is interrupted, it is particularly important to re-establish the subscription session in a timely manner so that the network device continues to report subscription data to the network management device.

In a conventional technology, re-establishing a subscription session requires manual configuration by network management personnel. To be specific, the network management personnel need to manually configure a subscription parameter, to trigger establishment of a subscription session. However, in such a manner, efficiency in re-establishing a subscription session is relatively low, and consequently, some important subscription data such as alarm information is not reported to the network management device in a timely manner.

Therefore, an embodiment of this application provides a device management method, to efficiently re-establish a subscription session. With reference to the accompanying drawings, the following describes a device management method provided in an embodiment of this application.

Before the device management method provided in this embodiment of this application is described, it should be noted that, in the application scenario shown in FIG. 1b, for normal communication between the network management device and the network device, the network management device may define a network device cluster expressed by using a YANG data model. Refer to FIG. 2a and FIG. 2b. FIG. 2a and FIG. 2b are schematic diagrams of YANG data models used to describe a network device cluster according to an embodiment of this application. Correspondingly, the network device may define a network management device cluster expressed by using a YANG data model. Refer to FIG. 2c and FIG. 2d. FIG. 2c and FIG. 2d are schematic diagrams of YANG data models used to describe a network management device cluster according to an embodiment of this application.

"augment/ncc:netconf-client/ncc:initiate/ncc:netconf-server" in FIG. 2a indicates that the YANG data model is used for a network management device to actively establish a NETCONF connection to a network device.

"augment/ncc:netconf-client/ncc:listen/ncc:endpoint" in FIG. 2b indicates that the YANG data model is used for a network device to actively establish a NETCONF connection to a network management device.

"cluster-role" is used to carry an active/standby status of a network device cluster, "active" is used to identify an active network device cluster, and "standby" is used to identify a standby network device cluster.

"primary-server" is used to carry an identifier of an active network device, and "Secondly-server" and "third-server" are used to carry identifiers of standby network devices. In another example, if the network device cluster includes only two network devices, "third-server" is invalid, or the "third-server" parameter is not included.

"augment/ncc:netconf-server/ncc:call-home/ncc:netconf-client" in FIG. 2c indicates that the YANG data model is used for a network device to actively establish a NETCONF connection to a network management device.

"augment/ncc:netconf-server/ncc:listen/ncc:endpoint" in FIG. 2d indicates that the YANG data model is used for a network management device to actively establish a NETCONF connection to a network device.

"cluster-role" is used to carry an active/standby status of a network management device cluster, "active" is used to identify an active network management device cluster, and "standby" is used to identify a standby network management device cluster.

"primary-client" is used to carry an identifier of an active network management device, and "Secondly-client" and "third-client" are used to carry identifiers of standby network management devices. In another example, if the network management device cluster includes only two network management devices, "third-client" is invalid, or the "third-client" parameter is not included.

Figure 3:
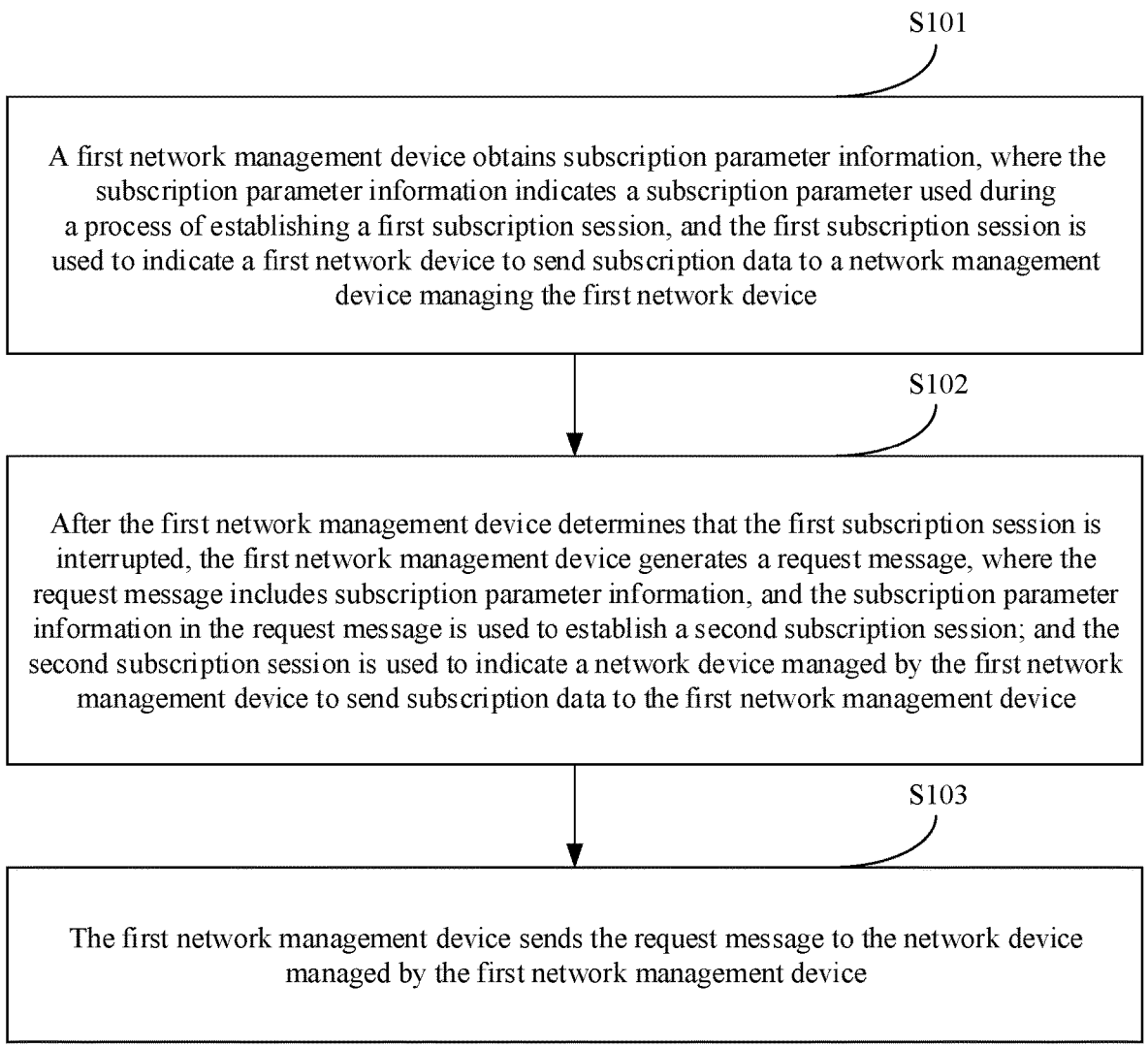
FIG. 3 is a schematic flowchart of a device management method according to an embodiment of this application.

FIG. 3 is a schematic flowchart of a device management method according to an embodiment of this application. The network management method provided in this embodiment of this application may be implemented by using the following S101 to S103.

S101: A first network management device obtains subscription parameter information, where the subscription parameter information indicates a subscription parameter used during a process of establishing a first subscription session, and the first subscription session is used to indicate a first network device to report subscription data to a network management device managing the first network device.

The subscription parameter information is not limited in this embodiment of this application. The subscription parameter information may indicate the subscription parameter used during the process of establishing the first subscription session. Therefore, in an embodiment, the subscription parameter information may be the subscription parameter used during the process of establishing the first subscription session. In addition, considering that in actual application, a subscription identifier of the first subscription session may identify the first subscription session, the subscription parameter used during the process of establishing the first subscription session may also be determined based on the subscription identifier. Therefore, in another implementation of this embodiment of this application, the subscription parameter information may alternatively be the subscription identifier of the first subscription session.

The subscription parameter used during the process of establishing the first subscription session is not specifically limited in this embodiment of this application. The subscription parameter may include, for example, a parameter that indicates the first network device to report to the network management device managing the first network device. The subscription parameter may include, for another example, a reporting manner in which the first network device is indicated to report subscription data, such as periodic reporting or reporting when the subscription data changes. Further, when the first network device periodically sends subscription data to the network management device managing the first network device, the subscription parameter may include a reporting period and the like. Example descriptions are not listed one by one herein.

In this embodiment of this application, the first network management device is a network management device that establishes a second subscription session after the first subscription session is interrupted. A subscription parameter used to re-establish the second subscription session is the same as the subscription parameter used during the process of establishing the first subscription session.

The network management device managing the first network device may be understood with reference to FIG. 1b. The network management device may be the first network management device or a second network management device. For example, if no switchover occurs on the network management device that establishes the first subscription session after the first subscription session is interrupted, the foregoing network management device managing the first network device is the first network management device. For example, if the first subscription session is interrupted due to a fault on the first network device, restart of the first network device, restart of the network management device managing the first network device, or the like, the network management device managing the first network device is the first network management device. After the first subscription session is interrupted, the first network management device establishes the second subscription session. If an active/standby switchover occurs on the network management device after the first subscription session is interrupted, the foregoing network management device managing the first network device is the second network management device. For example, if the first subscription session is interrupted due to a fault on the second network management device, and after the second network management device becomes faulty, the first network management device enters a working state, the foregoing network management device managing the first network device is the second network management device. After the first subscription session is interrupted, a standby device of the second network management device, namely, the first network management device, establishes the second subscription session.

Regarding the second network management device and the first network management device, it should be noted that, if the second network management device and the first network management device belong to a same network management device cluster, the first network management device is a standby device of the second network management device. For example, the second network management device is the network management device 111, and the first network management device is the network management device 112. For another example, the second network management device is the network management device 121, and the first network management device is the network management device 122. If the second network management device and the first network management device belong to different network management device clusters, for example, the first network management device belongs to a first network management device cluster and the second network management device belongs to a second network management device cluster, the first network management device cluster is a standby cluster of the second network management device cluster. In addition, the first network management device is an active device in the first network management device cluster, because when the standby network management device cluster enters a working state, an active device in the standby network management device cluster first enters the working state. In this case, the first network management device cluster may be the network management device cluster 120 shown in FIG. 1b, the first network management device may be the network management device 121, the second network management device cluster may be the network management device cluster 110 shown in FIG. 1b, and the second network management device may be the network management device 112.

In this embodiment of this application, the first network management device may pre-store the subscription parameter information. Therefore, the first network management device may obtain the subscription parameter information by reading the pre-stored subscription parameter information.

S102: After the first network management device determines that the first subscription session is interrupted, the first network management device generates a request message, where the request message includes subscription parameter information, and the subscription parameter information in the request message is used to establish a second subscription session; and the second subscription session is used to indicate a network device managed by the first network management device to send subscription data to the first network management device.

S103: The first network management device sends the request message to the network device managed by the first network management device.

Regarding S102 and S103, it should be noted that, in this embodiment of this application, there are a plurality of implementations in which the first network management device determines that the first subscription session is interrupted. In an embodiment, if the network management device managing the first network device is the first network management device, the first network management device may determine, by monitoring a NETCONF connection between the first network management device and the first network device, whether the first subscription session is interrupted. If the NETCONF connection between the first network management device and the first network device is interrupted, the first network management device may determine that the first subscription session is interrupted. In another implementation, if the network management device managing the first network device is the second network management device, for example, the first network management device is a standby device of the second network management device or the first network management device is an active device in the first network management device cluster, the first network management device enters the working state. This may indicate that the second network management device has stopped working, and therefore the first subscription session established by the second network management device is also interrupted. In this case, when the first network management device enters the working state, the first network management device may determine that the first subscription session is interrupted.

After determining that the first subscription session is interrupted, the first network management device may generate, according to the obtained subscription parameter information, the request message carrying the subscription parameter information. Then, the first network management device sends the request message to the network device managed by the first network management device, to establish the second subscription session between the first network management device and the network device managed by the first network management device. The second subscription session is used to indicate the network device managed by the first network management device to report subscription data to the first network management device.

In this embodiment of this application, the network device managed by the first network management device may be the first network device, or may be the second network device. For example, if no switchover occurs on the first network device after the first subscription session is interrupted, the foregoing network device managed by the first network management device is the first network device. For example, if the first subscription session is interrupted due to a fault on the first network management device, restart of the network management device managing the first network device, restart of the first network device, or the like, the network device managed by the first network management device is the first network device. After the first subscription session is interrupted, the first network management device establishes the second subscription session between the first network management device and the first network device. If the first network device does not continue to work after the first subscription session is interrupted, the foregoing network device managed by the first network management device is the second network device. For example, if the first subscription session is interrupted due to a fault on the first network device, and after the first network device becomes faulty, the second network device enters a working state, the foregoing network device managed by the first network management device is the second network device. After the first subscription session is interrupted, the first network management device establishes the second subscription session between the first network management device and the second network device.

Regarding the second network device and the first network device, it should be noted that, if the second network device and the first network device belong to a same network device cluster, the second network device is a standby device of the first network device. For example, the first network device is the network device 131, and the second network device is the network device 132. For another example, the first network device is the network device 141, and the second network device is the network device 142. If the second network device and the first network device belong to different network device clusters, for example, the first network device belongs to a first network device cluster and the second network device belongs to a second network device cluster, the second network device cluster is a standby cluster of the first network device cluster. In addition, the second network device is an active device in the second network device cluster, because when the standby network device cluster enters a working state, an active device in the standby network cluster first enters the working state. In this case, the first network device cluster may be the network device cluster 130 shown in FIG. 1b, the first network device may be the network device 132, the second network device cluster may be the network device cluster 140 shown in FIG. 1b, and the second network device may be the network device 141.

In this embodiment of this application, the first network management device may determine, by detecting a NETCONF connection between the first network management device and the first network device and a NETCONF connection between the first network management device and the second network device, that the network device managed by the first network management device is the first network device or the second network device. For example, if the NETCONF connection between the first network management device and the first network device is normal, the network device managed by the first network management device is the first network device. If the NETCONF connection between the first network management device and the second network device is normal, the network device managed by the first network management device is the second network device.

It can be understood that, in actual application, for the second network device in a standby state, once it enters the working state, a data processing logic of the second network device is the same as that of the first network device. Accordingly, a subscription data type that the second network device needs to report to the network management device is the same as a subscription data type that the first network device reports to the network management device. Similarly, for a network management device in the standby state, once it enters the working state, manners in which it controls and manages the network device is the same as manners in which an active device controls and manages the network device. In other words, if an active/standby switchover occurs on the first network device, after the second network device enters the working state, the second network device also needs to report, to the network management device, subscription data indicated by the first subscription session. If the standby network management device enters the working state, subscription data originally reported by the network device to the active network management device needs to continue to be reported to the standby network management device in the working state. It can be understood that when the original standby network management device enters the working state, the original standby network management device may be considered as a new active network management device. The following is described with examples with reference to the scenario shown in FIG. 1. In the scenario shown in FIG. 1, a first subscription session is established between a network management device 101 and a network device 103, and the first subscription session is used to indicate the network device 103 to report CPU utilization to the network management device 101. If the network device 103 becomes faulty, causing an interruption of the first subscription session, and after the network device 103 becomes faulty, a standby network device 104 of the network device 103 enters a working state, the network management device 101 needs to establish a second subscription session with the network device 104, to indicate the network device 104 to report CPU utilization to the network management device 101. If the network management device 101 becomes faulty, causing an interruption of the first subscription session, and after the network management device 101 becomes faulty, a network management device 102, which is a standby device of the network management device 101, enters the working state, the network management device 102 needs to establish a second subscription session with the network device 103, to indicate the network device 103 to report CPU utilization to the network management device 102.

In this embodiment of this application, regardless of restart of the network device, an active/standby switchover on the network device, restart of the network management device, or an active/standby switchover on the network management device, because the first network management device pre-stores subscription parameter information, after the first subscription session is interrupted, the first network management device may quickly generate a request message, to establish a second subscription session between the first network management device and a network device managed by the first network management device.

As previously described, the first network management device pre-stores the subscription parameter information. With reference to specific scenarios, the following describes specific implementations in which the first network management device stores the subscription parameter information.

Scenario 1: A network management device managing a first network device is the first network management device.

It can be understood that, in this case, the first subscription session is established by the first network management device. Moreover, the first subscription session is a subscription session between the first network management device and the first network device. Therefore, in an embodiment, after establishing the first subscription session, the first network management device may directly store the subscription parameter information, for example, store the subscription parameter information into a corresponding database.

In another implementation, before the first network device determines that the first network device needs to restart due to a fault or before an active/standby switchover needs to be performed, the first network device may send, to the first network management device, a first message carrying the subscription parameter information. The first network management device may store the subscription parameter information based on the first message. For example, the first message may be carried in a notification message, or may be carried in a keepalive packet and sent to the first network management device. This is not specifically limited in this embodiment of this application. The keepalive packet is a packet used to detect whether a NETCONF connection between the first network management device and the first network device is normal, and the first network device may periodically send the keepalive packet to the first network management device.

In this embodiment of this application, when the first message is a notification message, the first message may carry subscription parameter information expressed in a YANG data model. Refer to FIG. 4a and FIG. 4b. FIG. 4a is a schematic diagram of a structure of a YANG data model of a notification message according to an embodiment of this application. FIG. 4b is a schematic diagram of a structure of a YANG data model of a keepalive packet according to an embodiment of this application. In the YANG data models shown in FIG. 4a and FIG. 4b, description is as follows:

"type" is used to carry a type of the notification message, and the type of the notification message may include, for example, restart or an active/standby switchover.

"cluster-role" is used to carry an active/standby state of a network device cluster, and is used to indicate that the network device cluster is an active network device cluster or a standby network device cluster. The network device cluster may include a plurality of network devices. In FIG. 4a and FIG. 4b, three network devices are used as an example for description.

"primary-server" is used to carry an identifier of an active network device, and "Secondly-server" and "third-server" are used to carry identifiers of standby network devices. "Secondly-server" and "third-server" are valid when the type of the notification message is the active/standby switchover. In another example, if the network device cluster includes only two network devices, "third-server" is invalid. "static-subscription-id" is used to carry a subscription identifier of the first subscription session.

It should be noted that although the subscription identifier of the first subscription session is carried as shown in FIG. 4a and FIG. 4b, in actual application, the first message may alternatively carry a subscription parameter corresponding to the first subscription identifier, that is, carry a subscription parameter used during a process of establishing the first subscription session.

It can be understood that, in actual application, if the type of the notification message is the active/standby switchover, after the first subscription session is interrupted, the network device managed by the first network management device is no longer the first network device, but instead, is a second network device. In this case, the first message may carry an identifier of the second network device, which means that "Secondly-server" shown in FIG. 4a and FIG. 4b is valid. For example, the identifier of the second network device is used to indicate the first network management device to establish the second subscription session with the second network device after the first subscription session is interrupted. In other words, the first network management device may determine, also by using the first message, to send the request message generated in S102 to the second network device, to establish the second subscription session with the second network device.

Scenario 2: A network management device managing the first network device is a second network management device.

It can be understood that, in this case, the first subscription session is established by the second network management device. Therefore, after establishing the first subscription session, the second network management device may send the subscription parameter information to the first network management device, and after receiving the subscription parameter information from the second network management device, the first network management device may store the subscription parameter information, for example, store the subscription parameter information into a corresponding memory.

As previously described, in this embodiment of this application, the subscription parameter information may alternatively be the subscription identifier of the first subscription session. It can be understood that a subscription parameter is used to indicate a subscription data type and a data reporting manner for reporting to a network management device by a network device. Therefore, the network device managed by the first network management device can report subscription data to the first network management device only after determining the subscription parameter. In view of this, in an embodiment of this embodiment of this application, if the subscription parameter information is the subscription identifier of the first subscription session, the network device managed by the first network management device stores the subscription identifier and a subscription parameter corresponding to the subscription identifier. The subscription parameter corresponding to the subscription identifier is the subscription parameter used during the process of establishing the first subscription session. It can be understood that, in this way, after receiving the request message including the subscription identifier, the network device managed by the first network management device can determine, based on a mapping relationship stored by the network device itself between the subscription identifier and the subscription parameter, the subscription parameter corresponding to the subscription identifier, to report subscription data to the first network management device based on the subscription parameter.

With reference to specific scenarios, the following describes specific implementations in which the network device managed by the first network management device stores the subscription identifier and the subscription parameter.

Scenario 1: The network device managed by the first network management device is the first network device.

It can be understood that, if the network device managed by the first network management device is the first network device, it indicates that no active/standby switchover occurs on the network device after the first subscription session is interrupted. The first subscription session is established by the network management device managing the first network device, and during establishment of the first subscription session, the first network device can obtain the subscription parameter from the network management device managing the first network device. Therefore, in an embodiment of this embodiment of this application, after receiving the subscription parameter information, the first network device can store the subscription parameter and the corresponding subscription identifier. In addition, considering that in actual application, there may be many subscription sessions between the first network device and the network management device managing the first network device, if the first network device stores a subscription parameter corresponding to each subscription session, a relatively large amount of storage space of the first network device may be occupied. Therefore, in another implementation of this embodiment of this application, the first network device may store, based on an indication from the network management device managing the first network device, a subscription parameter corresponding to the first subscription session. For example, the first network device may store, based on a second message from the network management device managing the first network device, the subscription identifier and the subscription parameter corresponding to the subscription identifier.

Figures 5, 6:
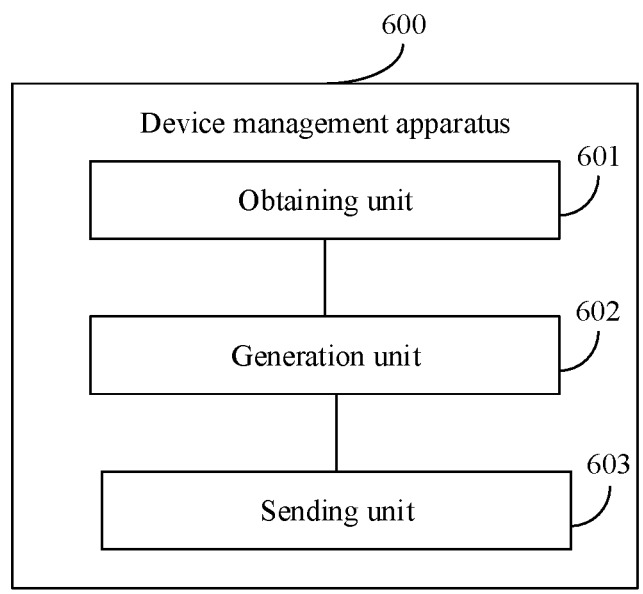
FIG. 5 is a schematic diagram of a YANG data model of a second message according to an embodiment of this application.
FIG. 6 is a schematic diagram of a structure of a device management apparatus according to an embodiment of this application.

In an embodiment of this embodiment of this application, to reduce a quantity of interactions between the first network device and the network management device managing the first network device, the second message may be carried in a message for establishing the first subscription session. In other words, when establishing the first subscription session, the network management device managing the first network device indicates the first network device to store the subscription identifier and the subscription parameter. For example, the message for establishing the first subscription session can be extended, to add the second message to an extended message, so that the first network device can store the subscription identifier and the subscription parameter based on the message. For example, the message for establishing the first subscription session may carry the second message expressed in a YANG data model, and the second message expressed in the YANG data model is described below with reference to the accompanying drawings. Refer to FIG. 5. FIG. 5 is a schematic diagram of a YANG data model of a second message according to an embodiment of this application. In the YANG data model shown in FIG. 5, description is as follows:

"flag" is used to carry a message type, and to indicate the first network device to store the subscription identifier and the subscription parameter.

"timeout" is used to carry a time, and is used to indicate the first network device to store the subscription identifier and the subscription parameter in a time period after the first subscription session is interrupted, and "timeout" is an optional parameter.

"client-cluster-role" is used to carry an active/standby status of a network management device cluster, and is used to indicate that the network management device cluster is an active network management device cluster or a standby network management device cluster. The network management device cluster may include a plurality of network management devices. In FIG. 5, three network management devices are used as an example for description.

A "primary-client" is used to carry an identifier of an active network management device, and a "secondary-client" and a "third-client" are used to carry identifiers of standby network management devices. When the network management device managing the first network device has a standby device, the "secondary-client" and "third-client are valid when the type of the notification message is the active/standby switchover. In another example, if the network management device cluster includes only two network management devices, the "third-client" is invalid.

It can be understood that, in actual application, if the network management device managing the first network device is the second network management device, and after the first subscription session is interrupted, an active/standby switchover occurs on the network management device managing the first network device, the second message may further carry an identifier of the first network management device. The identifier of the first network management device is used to indicate the first network device to establish the second subscription session after receiving the request message from the first network management device. In other words, after receiving the request message from the first network management device, the first network device may further verify whether the request message is from a network management device that has permission to manage the first network device. After determining that the request message is from a standby device of the second network management device, the first network device may determine that the verification succeeds, to establish the second subscription session and send subscription data to the first network management device based on the second subscription session.

Scenario 2: The network device managed by the first network management device is the second network device.

It can be understood that, if the network device managed by the first network management device is the second network device, it indicates that an active/standby switchover occurs on the network device after the first subscription session is interrupted. The first subscription session is established by the network management device managing the first network device, and during establishment of the first subscription session, the first network device can obtain the subscription parameter from the network management device managing the first network device. Therefore, in an embodiment of this embodiment of this application, after receiving the subscription parameter information, the first network device can send the subscription parameter and the corresponding subscription identifier to the second network device, and the second network device can store the subscription parameter and the corresponding subscription identifier.

Similarly, considering that in actual application, there may be many subscription sessions between the first network device and the network management device managing the first network device, if the first network device sends, to the second network device, a subscription parameter and a subscription identifier that correspond to each subscription session, a relatively large amount of data exchanged between the first network device and the second network device is caused. This occupies a relatively large quantity of input/output (I/O) resources of the first network device. Therefore, in another implementation of this embodiment of this application, the first network device may send, to the second network device based on an indication from the network management device managing the first network device, the subscription parameter and the subscription identifier corresponding to the first subscription session. For example, the first network device may send, to the second network device based on a third message from the network management device managing the first network device, the subscription identifier and the subscription parameter corresponding to the subscription identifier.

In an embodiment of this embodiment of this application, to reduce a quantity of interactions between the first network device and the network management device managing the first network device, the third message may be carried in a message for establishing the first subscription session. In other words, when establishing the first subscription session, the network management device managing the first network device indicates the first network device to send the subscription identifier and the subscription parameter to the second network device. For example, the message for establishing the first subscription session can be extended, to add the third message to an extended message, so that the first network device can send the subscription identifier and the subscription parameter to the second network device based on the message.

Regarding the subscription identifier corresponding to the first subscription session, it should be noted that the subscription identifier may be a first identifier generated when the first subscription session is established, or a second identifier generated by the first network device after the first subscription session is established. This is not specifically limited in this embodiment of this application. Considering that in actual application, when analyzing subscription data sent by the network device, the network management device may use the first identifier as an index to analyze subscription data that is reported by the network device in a time period and that corresponds to the first identifier, to determine a working status of the network device. After the first subscription session is interrupted, when the first network management device generates the request message to establish the second subscription session, the first network management device may generate a third identifier corresponding to the second subscription session. Generally, the third identifier is not the same as the first identifier. It can be understood that, if the network management device managing the first network device is the first network management device, and the network device managed by the first network management device is the first network device, both the first subscription session and the second subscription session are subscription sessions between the first network management device and the first network device, and indicate a same data type reported by the first network device to the first network management device. In this case, in this embodiment of this application, the subscription identifier carried in the request message generated by the first network management device may be the first identifier generated when the first subscription session is established. In this way, the first subscription session and the second subscription session correspond to a same subscription identifier, which is the first identifier, to help the first network management device analyze subscription data reported by the first network device based on the first subscription session and the second subscription session, thereby better helping the first network management device determine a running status of the first network device.

It can be understood that, for the scenario shown in FIG. 1b, if the first subscription session is a subscription session between the network management device 111 and the network device 131, when the network device 131 is faulty, the network management device 111 may perform the method provided in this embodiment of this application to re-establish a second subscription session with the network device 132. Further, if the network device 132 becomes faulty, the network management device 111 may perform the method provided in this embodiment of this application to re-establish a third subscription session with the network device 141. Similarly, if the network management device 111 becomes faulty, the network management device 112 may perform the method provided in this embodiment of this application to establish a second subscription session with the network device 131. Further, if the network management device 112 becomes faulty, the network management device 121 may perform the method provided in this embodiment of this application to establish a third subscription session with the network device 131.

Based on the device management method provided in the foregoing embodiments, an embodiment of this application further provides a corresponding apparatus. The apparatus is described below with reference to the accompanying drawings. FIG. 6 is a schematic diagram of a structure of a device management apparatus according to an embodiment of this application. The device management apparatus 600 shown in FIG. 6 may be applied to the first network management device mentioned in the foregoing embodiments, to perform the device management method described in FIG. 3. For example, the device management apparatus 600 may include an obtaining unit 601, a generation unit 602, and a sending unit 603.

The obtaining unit 601 is configured to obtain subscription parameter information, where the subscription parameter information indicates a subscription parameter used during a process of establishing a first subscription session, and the first subscription session is used to indicate a first network device to send subscription data to a network management device managing the first network device.

The generation unit 602 is configured to generate a request message after it is determined that the first subscription session is interrupted, where the request message includes the subscription parameter information, and the subscription parameter information in the request message is used to establish a second subscription session; the second subscription session is used to indicate a network device managed by the first network management device to send subscription data to the first network management device; and the network device managed by the first network management device includes a second network device or the first network device.

The sending unit 603 is configured to send the request message to the network device managed by the first network management device.

In an embodiment, the network management device managing the first network device includes a second network management device. The first network management device and the second network management device belong to a same network management device cluster, and the first network management device is a standby device of the second network management device. Alternatively, the first network management device belongs to a first network management device cluster, the second network management device belongs to a second network management device cluster, the first network management device is an active device in the first network management device cluster, and the first network management device cluster is a standby network management device cluster of the second network management device cluster.

In an embodiment, the first network device and the second network device belong to a same network device cluster, and the second network device is a standby device of the first network device. Alternatively, the first network device belongs to a first network device cluster, the second network device belongs to a second network device cluster, the second network device is an active device in the second network device cluster, and the second network device cluster is a standby network device cluster of the first network device cluster.

In an embodiment, the obtaining unit 601 is configured to obtain the pre-stored subscription parameter information.

In an embodiment, the network management device managing the first network device is the first network management device, and the apparatus 600 further includes a first receiving unit and a first storage unit. The first receiving unit is configured to receive a first message from the first network device, where the first message carries the subscription parameter information. The first storage unit is configured to store the received subscription parameter information.

In an embodiment, when the network device managed by the first network management device is the second network device, the first message carries an identifier of the second network device, and the identifier of the second network device is used to indicate the first network management device to establish the second subscription session with the second network device.

In an embodiment, the apparatus 600 further includes a second receiving unit and a second storage unit. The second receiving unit is configured to receive the subscription parameter information from the second network management device. The second storage unit is configured to store the received subscription parameter information. The obtaining unit 601 is configured to obtain the pre-stored subscription parameter information.

In an embodiment, the subscription parameter information includes a subscription parameter of the first subscription session, and the subscription parameter of the first subscription session is the subscription parameter used during the process of establishing the first subscription session.

In an embodiment, the subscription parameter information includes a subscription identifier of the first subscription session. The network device managed by the first network management device stores the subscription identifier and a subscription parameter corresponding to the subscription identifier, and the subscription parameter is the subscription parameter used during the process of establishing the first subscription session.

In an embodiment, when the network device managed by the first network management device is the first network device, the corresponding subscription identifier and subscription parameter that are stored in the first network device are stored based on a second message from the network management device managing the first network device.

In an embodiment, the second message is carried in a message for establishing the first subscription session.

In an embodiment, when the network management device managing the first network device is the second network management device, the second message further carries an identifier of the first network management device, and the identifier of the first network management device is used to indicate the first network device to establish the second subscription session after receiving the request message from the first network management device.

In an embodiment, when the network device managed by the first network management device is the second network device, the corresponding subscription identifier and subscription parameter that are stored in the second network device are sent by the first network device to the second network device.

In an embodiment, the corresponding subscription identifier and subscription parameter that are stored in the second network device are sent by the first network device to the second network device based on a third message, and the third message is from the network management device managing the first network device.

In an embodiment, the third message is carried in a message for establishing the first subscription session.

Because the apparatus 600 is an apparatus corresponding to the device management method corresponding to FIG. 3 and described in the foregoing embodiment, specific implementation of units of the apparatus 600 has a same concept as that of the foregoing method embodiment. Therefore, for specific implementation of the units of the apparatus 600, refer to the description part of the device management method corresponding to FIG. 3 in the foregoing method embodiment. Details are not described herein again.

Figure 7:
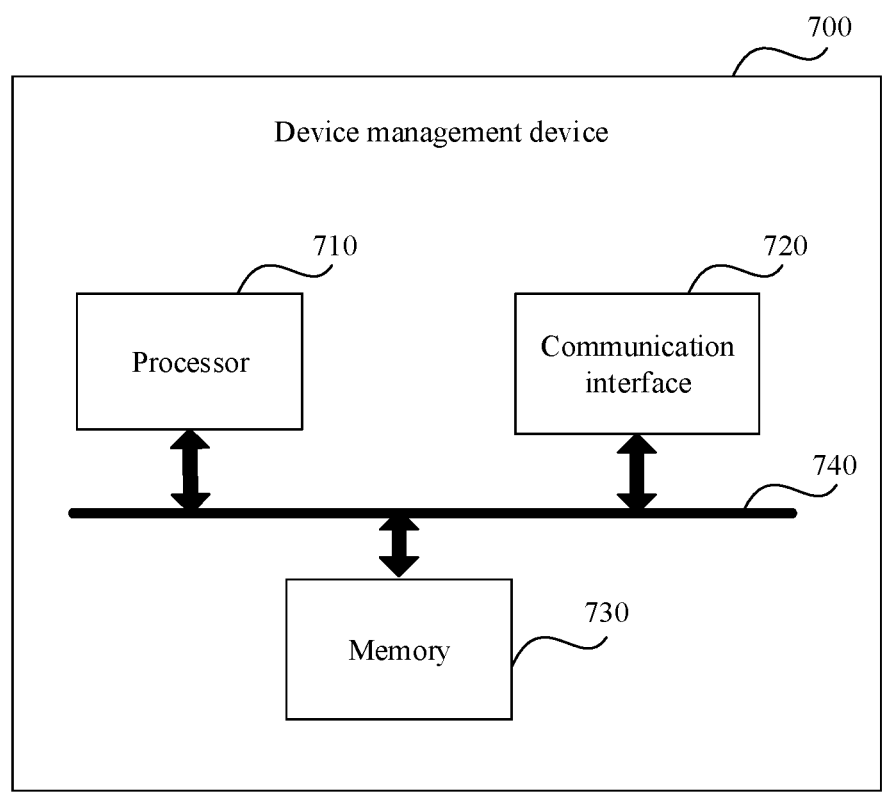
FIG. 7 is a schematic diagram of a structure of a device management device according to an embodiment of this application.

It should be noted that a hardware structure of the device management apparatus 600 mentioned above may be a structure shown in FIG. 7. FIG. 7 is a schematic diagram of a structure of a device management device according to an embodiment of this application.

Refer to FIG. 7. The device management device 700 includes a processor 710, a communication interface 720, and a memory 730. There may be one or more processors 710 in the device management device 700, and there is one processor as an example in FIG. 7. In this embodiment of this application, the processor 710, the communication interface 720, and the memory 730 may be connected by using a bus system or in another manner. In FIG. 7, for example, the processor 710, the communication interface 720, and the memory 730 are connected by using a bus system 740.

The processor 710 may be a central processing unit (CPU), a network processor (network processor, NP), or a combination of a CPU and an NP. The processor 710 may further include a hardware chip. The hardware chip may be an application-specific integrated circuit (application-specific integrated circuit, ASIC), a programmable logic device (PLD), or a combination thereof. The PLD may be a complex programmable logic device (CPLD), a field programmable gate array (FPGA), a generic array logic (GAL), or any combination thereof.

The memory 730 may include a volatile memory, for example, a random access memory (RAM). Alternatively, the memory 730 may include a non-volatile memory, for example, a flash memory, a hard disk drive (HDD), or a solid-state drive (SSD). The memory 730 may further include a combination of the foregoing types of memories. The memory 730 may store, for example, the foregoing subscription parameter information.

Optionally, the memory 730 stores an operating system and a program, an executable module or a data structure, a subset thereof, or an extended set thereof. The program may include various operation instructions, to implement various operations. The operating system may include various system programs, to implement various basic services and process hardware-based tasks. The processor 710 may read the program from the memory 730, to implement the time synchronization method or the message processing method for time synchronization provided in this embodiment of this application.

The bus system 740 may be a peripheral component interconnect (PCI) bus, an extended industry standard architecture (EISA) bus, or the like. The bus system 740 may be classified into an address bus, a data bus, a control bus, and the like. For ease of representation, only one thick line is used to represent the bus in FIG. 7, but this does not mean that there is only one bus or only one type of bus.

An embodiment of this application further provides a computer-readable storage medium, including instructions or a computer program. When the instructions are run or the computer program is run on a computer, the computer is enabled to perform the device management method provided in the foregoing embodiments.

An embodiment of this application further provides a computer program product including instructions or a computer program. When the instructions are run or the computer program is run on a computer, the computer is enabled to perform the device management method provided in the foregoing embodiments.

In this application, terms such as "first", "second", "third", "fourth", and the like (if exist) in the specification, the claims, and the accompanying drawings are intended to distinguish between similar objects but do not necessarily indicate a specific order or sequence. It should be understood that the data termed in such a way is interchangeable in proper circumstances so that this embodiment described herein can be implemented in orders other than the order illustrated or described herein. Moreover, the terms "include", "contain" and any other variants mean to cover the non-exclusive inclusion, for example, a process, method, system, product, or device that includes a list of steps or units is not necessarily limited to those steps or units, but may include other steps or units not expressly listed or inherent to such a process, method, product, or device.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed systems, apparatuses, and methods may be implemented in another manner. For example, the described apparatus embodiment is merely an example. For example, division into the units is merely logical service division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, in other words, may be located in one position, or may be distributed on a plurality of network units. Some or all of the units may be selected based on actual requirements to achieve the objectives of the solutions of the embodiments.

In addition, service units in embodiments of this application may be integrated into one processing unit, or each of the units may exist alone physically, or two or more units are integrated into one unit. The integrated unit may be implemented in a form of hardware, or may be implemented in a form of a software service unit.

When the integrated unit is implemented in a form of a software service unit and sold or used as an independent product, the integrated unit may be stored in a computer-readable storage medium. Based on such an understanding, the technical solutions of this application essentially, or the part contributing to the current technology, or all or some of the technical solutions may be implemented in the form of a software product. The computer software product is stored in a storage medium and includes a plurality of instructions for instructing a computer device (which may be a personal computer, a server, a network device, or the like) to perform all or some of the steps of the methods described in embodiments of this application. The foregoing storage medium includes: any medium that can store program code, such as a USB flash drive, a removable hard disk, a read-only memory (ROM), a random access memory (RAM), a magnetic disk, or an optical disc.

Persons skilled in the art should be aware that in the foregoing one or more examples, the services described in the present application may be implemented by hardware, software, firmware, or any combination thereof. When the present application is implemented by software, the services may be stored in a computer-readable medium or transmitted as one or more instructions or code in the computer-readable medium. The computer-readable medium includes a computer storage medium and a communication medium, where the communication medium includes any medium that enables a computer program to be transmitted from one place to another. The storage medium may be any available medium accessible to a general-purpose or dedicated computer.

The objectives, technical solutions, and beneficial effects of the present application have been described in further detail in the foregoing specific implementations. It should be understood that the foregoing descriptions are merely specific implementations of the present application.

The foregoing embodiments are merely intended for describing the technical solutions of this application instead of limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A method for device management by a first network management device, the method comprising:
    obtaining, by the first network management device, subscription parameter information expressed in a YANG data model, wherein the subscription parameter information expressed in the YANG data model indicates a subscription parameter used during a process of establishing a first subscription session indicating a first network device to send subscription data to a network management device managing the first network device;
    after the first network management device having determined that the first subscription session is interrupted, generating, by the first network management device, a request message comprising the subscription parameter information for establishing a second subscription session indicating a network device managed by the first network management device to send subscription data to the first network management device; the network device comprising a second network device or the first network device; and
    sending, by the first network management device, the request message to the network device managed by the first network management device to establish the second subscription session between the network device and the first network management device without manual configuration.

2. The method according to claim 1, wherein the network management device managing the first network device comprises a second network management device; and
    the first network management device and the second network management device belong to a same network management device cluster, and the first network management device is a standby device of the second network management device; or the first network management device belongs to a first network management device cluster, the second network management device belongs to a second network management device cluster, the first network management device is an active device in the first network management device cluster, and the first network management device cluster is a standby network management device cluster of the second network management device cluster.

3. The method according to claim 1, wherein the first network device and the second network device belong to a same network device cluster, and the second network device is a standby device of the first network device; or the first network device belongs to a first network device cluster, the second network device belongs to a second network device cluster, the second network device is an active device in the second network device cluster, and the second network device cluster is a standby network device cluster of the first network device cluster.

4. The method according to claim 1, wherein the obtaining, by the first network management device, subscription parameter information comprises:

obtaining, by the first network management device, pre-stored subscription parameter information.

5. The method according to claim 4, wherein the network management device managing the first network device is the first network management device, and the method further comprises:

receiving, by the first network management device, a first message from the first network device, wherein the first message carries the subscription parameter information; and storing, by the first network management device, the obtained subscription parameter information.

6. The method according to claim 5, wherein when the network device managed by the first network management device is the second network device, the first message carries an identifier of the second network device, and the identifier of the second network device is used to indicate the first network management device to establish the second subscription session with the second network device.

7. The method according to claim 2, further comprising:

receiving, by the first network management device, the subscription parameter information from the second network management device; and storing, by the first network management device, the received subscription parameter information; and the obtaining, by a first network management device, subscription parameter information comprises:

obtaining, by the first network management device, pre-stored subscription parameter information.

8. The method according to claim 1, wherein the subscription parameter information comprises a subscription parameter of the first subscription session, and the subscription parameter of the first subscription session is the subscription parameter used during the process of establishing the first subscription session.

9. The method according to claim 1, wherein the subscription parameter information comprises:

a subscription identifier of the first subscription session, wherein the network device managed by the first network management device stores the subscription identifier and a subscription parameter corresponding to the subscription identifier, and the subscription parameter is the subscription parameter used during the process of establishing the first subscription session.

10. The method according to claim 9, wherein when the network device managed by the first network management device is the first network device, the corresponding subscription identifier and subscription parameter that are stored in the first network device are stored based on a second message from the network management device managing the first network device.

11. The method according to claim 10, wherein the second message is carried in a message for establishing the first subscription session.

12. The method according to claim 10, wherein when the network management device managing the first network device is the second network management device, the second message further carries an identifier of the first network management device, and the identifier of the first network management device is used to indicate to establish the second subscription session after the first network device receives the request message from the first network management device.

13. The method according to claim 9, wherein when the network device managed by the first network management device is the second network device, the corresponding subscription identifier and subscription parameter that are stored in the second network device are sent by the first network device to the second network device.

14. The method according to claim 13, wherein the corresponding subscription identifier and subscription parameter that are stored in the second network device are sent by the first network device to the second network device based on a third message, and the third message is from the network management device managing the first network device.

15. The method according to claim 14, wherein the third message is carried in a message for establishing the first subscription session.

16. A device management apparatus, applied to a first network management device, wherein the apparatus comprises:

a non-transitory memory storing instructions; and a processor coupled to the non-transitory memory; wherein the instructions, when executed by the processor, cause the device management apparatus to be configured to:

obtain subscription parameter information expressed in a YANG data model, wherein the subscription parameter information expressed in the YANG data model indicates a subscription parameter used during a process of establishing a first subscription session, and the first subscription session is used to indicate a first network device to send subscription data to a network management device managing the first network device;

generate a request message after it is determined that the first subscription session is interrupted, wherein the request message comprises the subscription parameter information, and the subscription parameter information in the request message is used to establish a second subscription session; the second subscription session is used to indicate a network device managed by the first network management device to send subscription data to the first network management device; and the network device managed by the first network management device comprises a second network device or the first network device; and send the request message to the network device managed by the first network management device to establish the second subscription session between the network device and the first network management device without manual configuration.

17. The apparatus according to claim 16, wherein the network management device managing the first network device comprises a second network management device; and
the first network management device and the second network management device belong to a same network management device cluster, and the first network management device is a standby device of the second network management device; or
the first network management device belongs to a first network management device cluster, the second network management device belongs to a second network management device cluster, the first network management device is an active device in the first network management device cluster, and the first network management device cluster is a standby network management device cluster of the second network management device cluster.

18. The apparatus according to claim 16, wherein the first network device and the second network device belong to a same network device cluster, and the second network device is a standby device of the first network device; or
the first network device belongs to a first network device cluster, the second network device belongs to a second network device cluster, the second network device is an active device in the second network device cluster, and the second network device cluster is a standby network device cluster of the first network device cluster.

19. The apparatus according to claim 16 wherein the instructions, when executed by the processor, further cause the apparatus to be configured to:
obtain pre-stored subscription parameter information.

20. A non-transitory computer-readable storage medium, comprising instructions or a computer program, wherein when the instructions are run or the computer program is run on a computer, the computer is enabled to:
obtain, by a first network management device, subscription parameter information expressed in a YANG data model, wherein the subscription parameter information expressed in the YANG data model indicates a subscription parameter used during a process of establishing a first subscription session indicating a first network device to send subscription data to a network management device managing the first network device;
after the first network management device having determined that the first subscription session is interrupted, generate, by the first network management device, a request message comprising the subscription parameter information for establishing a second subscription session indicating a network device managed by the first network management device to send subscription data to the first network management device; the network device comprising a second network device or the first network device; and
send, by the first network management device, the request message to the network device managed by the first network management device to establish the second subscription session between the network device and the first network management device without manual configuration.

* * * * *